(12) United States Patent
Tsuji

(10) Patent No.: US 6,616,165 B2
(45) Date of Patent: Sep. 9, 2003

(54) METER DISPLAY DEVICE FOR SADDLE TYPE VEHICLE

(75) Inventor: Misturu Tsuji, Shuuchi-gun (JP)

(73) Assignee: Kabushiki Kaisha Moric, Shuuchi-gun (JP)

(*) Notice: Subject to any disclaimer, the term of this patent is extended or adjusted under 35 U.S.C. 154(b) by 0 days.

(21) Appl. No.: 09/681,662

(22) Filed: May 17, 2001

(65) Prior Publication Data
US 2001/0048403 A1 Dec. 6, 2001

(30) Foreign Application Priority Data
May 30, 2000 (JP) .......................... 2000-161293

(51) Int. Cl.[7] .................................. B62J 1/00
(52) U.S. Cl. .................... 280/288.4; 280/263; 280/769; 180/90
(58) Field of Search .............. 296/37.1, 37.12, 296/70; 280/288.4, 263, 769; 180/89.1, 90

(56) References Cited

U.S. PATENT DOCUMENTS

| 4,169,476 A | * | 10/1979 | Hiltebrandt | 29/243.56 |
| 4,522,442 A | * | 6/1985 | Takenaka | 180/215 |
| 4,630,160 A | * | 12/1986 | Murayama | 296/37.1 |
| 4,830,134 A | * | 5/1989 | Hashimoto | 180/219 |
| 4,895,284 A | * | 1/1990 | Nogami et al. | 224/413 |
| 5,040,632 A | * | 8/1991 | Fujii et al. | 180/219 |
| 5,127,561 A | * | 7/1992 | Miyamoto | 224/413 |
| 6,249,744 B1 | * | 6/2001 | Morita | 340/988 |
| 6,428,075 B2 | * | 8/2002 | Kamemizu et al. | 292/210 |

* cited by examiner

Primary Examiner—Paul N. Dickson
Assistant Examiner—Toan C To
(74) Attorney, Agent, or Firm—Ernest A. Beutler

(57) ABSTRACT

A combined storage box and vehicle condition display for a small vehicle such as a scooter. The display is mounted in the handlebar cover and the mounting is done in a way so that the display can be mounted from above and still provides a neat appearance for the finished product.

5 Claims, 4 Drawing Sheets

US 6,616,165 B2

METER DISPLAY DEVICE FOR SADDLE TYPE VEHICLE

BACKGROUND OF INVENTION

This invention relates a meter display device for a saddle type vehicle such as a motor scooter.

Motor scooters are very popular because of their low costs, both in acquisition and maintenance and their agility for use in traffic. In order to provide the rider for some indication of the operation of the scooter, it has been the practice to provide one or more instruments in proximity to the handlebar assembly. However, it is important that these instruments and their associated displays be mounted so as to provide a neat appearance. Unfortunately, the prior art type of constructions proposed for this purpose have not been totally successful.

Frequently in order to improve the appearance of the scooter, a handlebar cover is provided over the handlebar assembly. This conceals some of the mechanism and gives rise to a neater appearance. It has been proposed to mount the instrument or display on this cover but in order to make a neat assembly; the display has been mounted from the underside of the cover with its display face showing through an opening in the cover. This provides significant difficulties in assembly and also in servicing.

It is, therefore, a principal object to this invention to provide an improved display mounting arrangement for a small vehicle of the scooter type.

It is a further object to this invention to provide an improved display for a motor scooter wherein the display can be mounted from above but nevertheless provides a neat appearance.

Because of the small nature of these vehicles and the desirability of providing some storage compartment for small articles, storage compartments have been provided under the seat. However, this means that the rider must stop the vehicle and dismount in order to procure from or place articles in the storage compartment.

It is, therefore, a still further object to this invention to provide an improved display mounting for a vehicle of this type wherein the display is mounted on the underside of a cover, which also serves a cover for a storage compartment.

SUMMARY OF INVENTION

This invention is adapted to be embodied in a small vehicle of the scooter type wherein the vehicle has a seat upon which a rider is seated with his feet extending forwardly and downwardly. A handlebar assembly is provided at the front of the seat and the vehicle for steering of the vehicle in its path of movement. A cover is associated with the handlebar assembly. A display is mounted on the cover from above.

DETAILED DESCRIPTION

Figure 1:
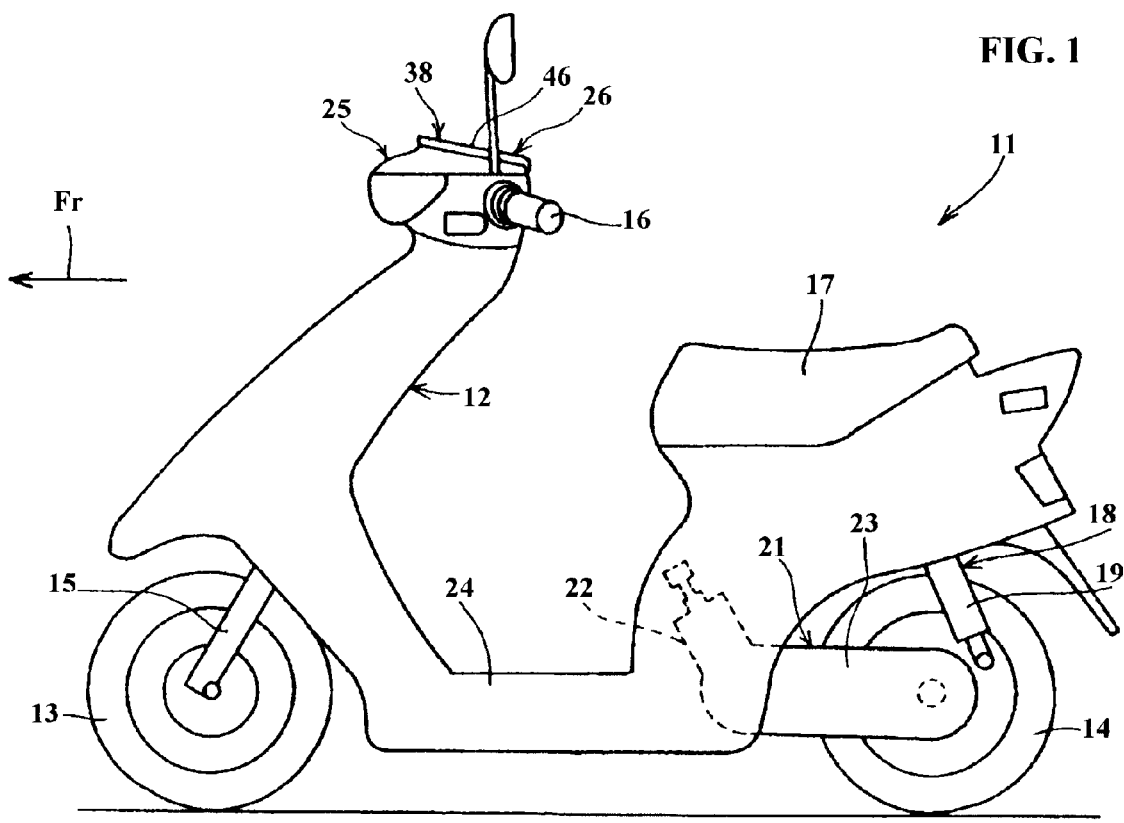
FIG. 1 is a side elevational view of a motor scooter constructed in accordance with an embodiment of the invention.

Referring first to FIG. 1, a motor scooter constructed in accordance with an embodiment of the invention is identified generally by the reference numeral 11. The motor scooter 11 includes a main body portion, indicated generally by the reference numeral 12, from which a front wheel 13 and rear wheel 14 are suspended. The front wheel 13 is dirigibly supported by the main body portion 12 in a known manner by means that includes a front fork 15 that is steered by a handlebar assembly 16.

The rear wheel 14 underlies a rider"s seat 17 and is journalled by a suspension system, indicated generally by the reference numeral 18 and which includes a rear shock absorber 19. An engine transmission assembly, indicated generally by the reference numeral 21 consists of an internal combustion engine 22 and a transmission 23 that drives the rear wheel 14. This engine transmission assembly 21 is pivotally mounted on the main body portion 12 by the suspension system 18 in a suitable manner for accommodating the suspension movement of the rear wheel 14.

A foot area 24 is formed by the main body portion 12 forwardly of the seat 17 so that a rider seated on the seat may place his feet on the foot area 24.

Figure 2:
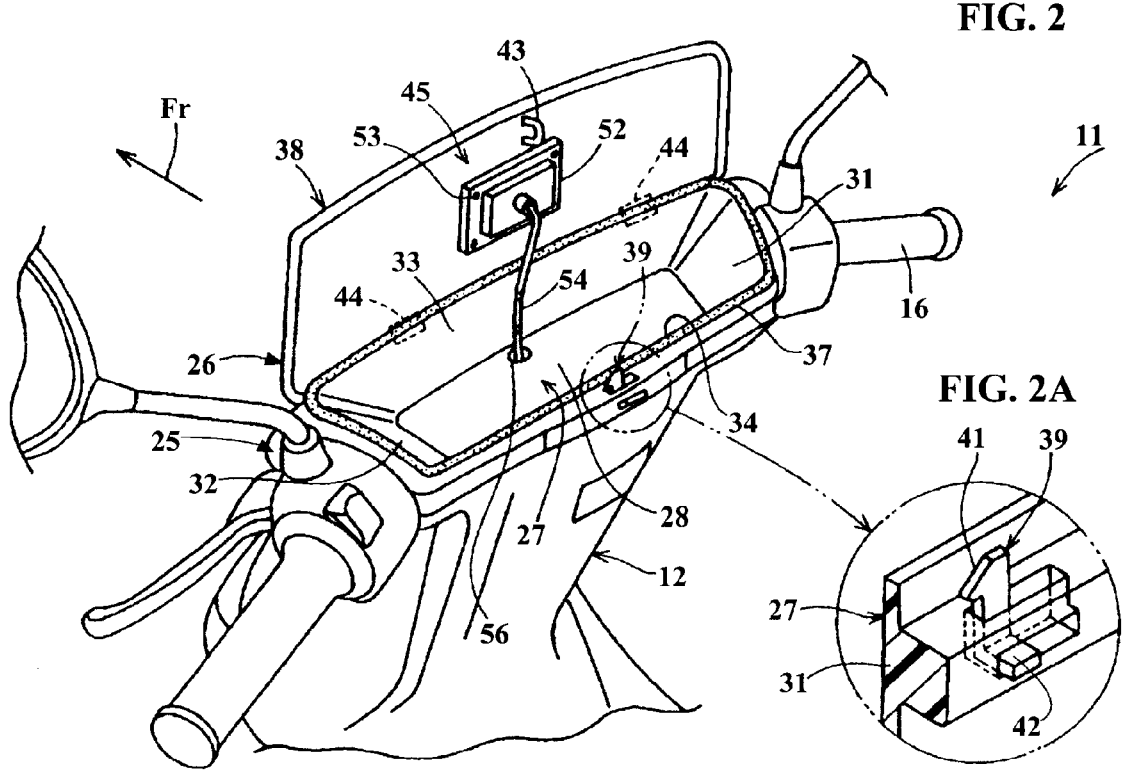
FIG. 2 is a perspective view showing the control handlebar assembly for the vehicle with the storage compartment and display mounting closure in an opened position.
Figure 3:
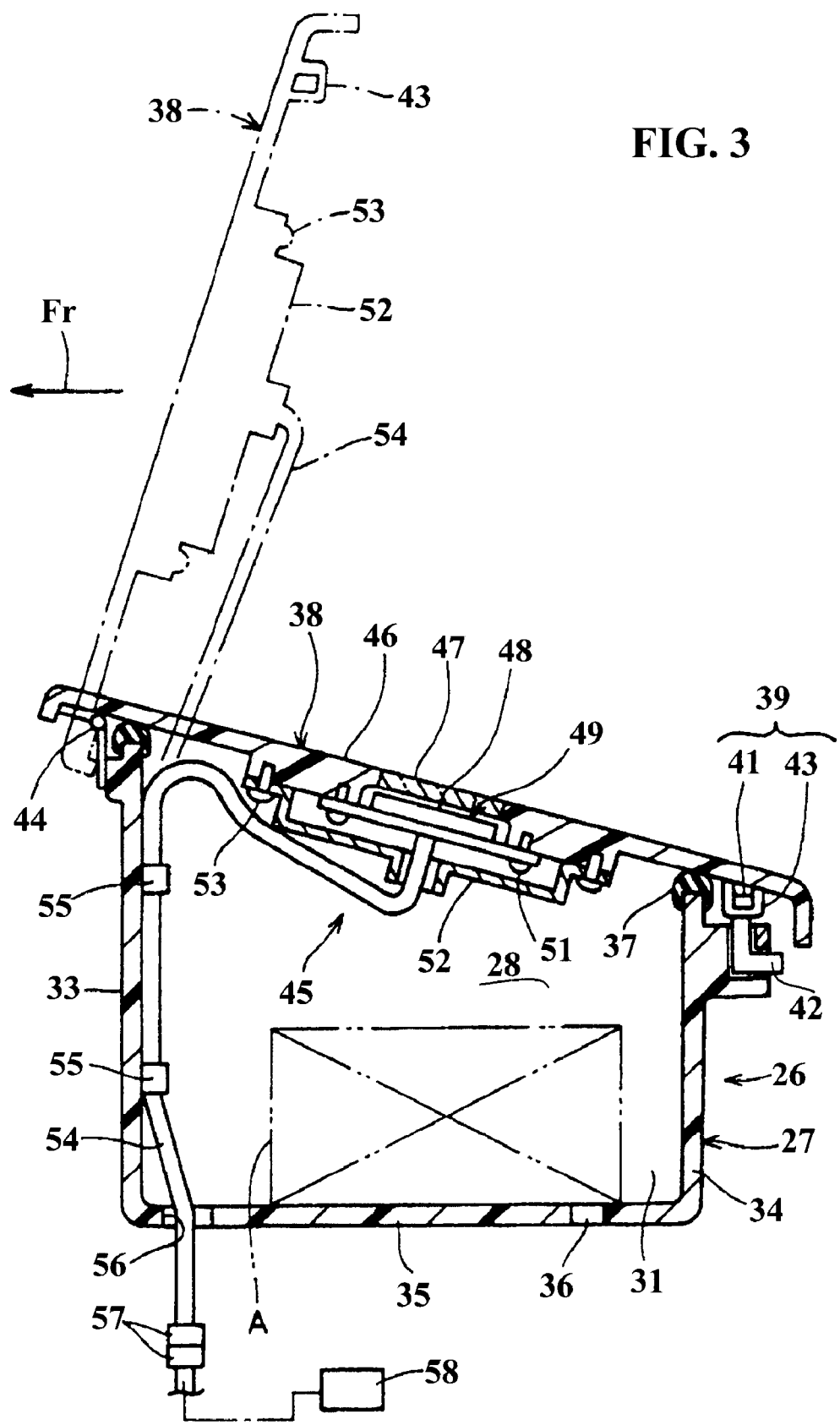
FIG. 3 is a cross-sectional view taken through the cover assembly and showing the storage compartment in its closed position in solid lines and in its open position in phantom.
Figure 4:
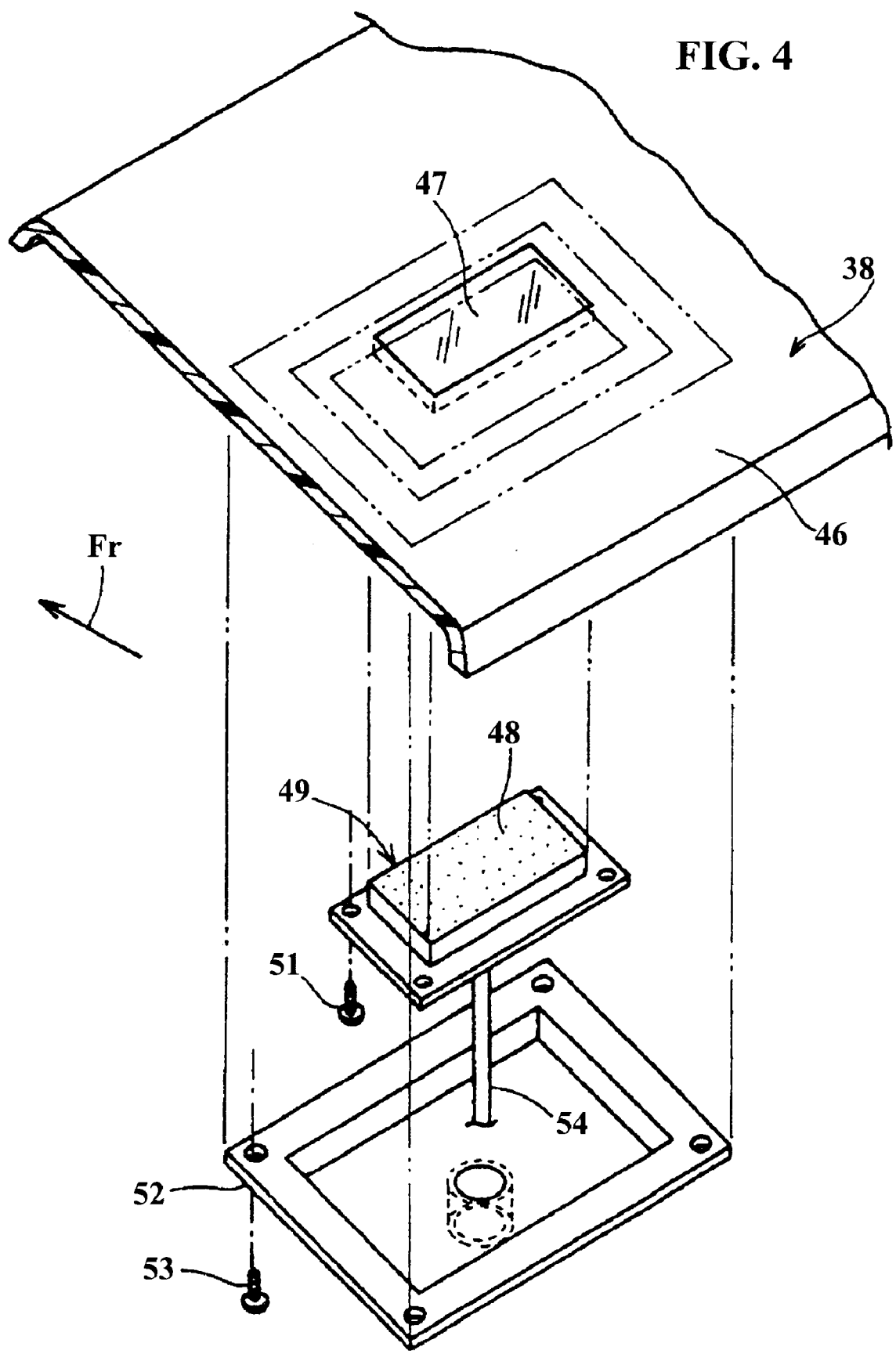
FIG. 4 is an exploded perspective view of the storage compartment closure and display mounting construction.

The handlebar assembly 16 is enclosed by a cover comprised of a main cover portion 25 and which is shown in perspective view in FIG. 2 and in cross sectional in FIG. 3. Referring now specifically to those figures and the partially exploded view of FIG. 4, a combined storage and display arrangement, indicated generally by the reference numeral 26 is accommodated in the cover 25. The cover 25 has an opening, which receives a plastic storage box 27 that forms an internal compartment 28 in which small articles may be positioned such as the article "A" shown in FIG. 3.

This internal compartment 28 is bounded by sidewalls 31 and 32, a front wall 33 and a rear wall 34. A lower wall 35 completes this storage box 27. A drain opening 36 is formed in the lower wall 35 so as to permit any water, which may enter it to drain out.

A sealing gasket 37 is affixed to the upstanding edges of the walls 31 through 34 and is engaged by a pivoted cover or closure member, indicated generally by the reference numeral 38, when the cover 38 is in its closed position as shown in the solid line view of FIG. 3. The cover 38 is maintained in its closed position with the box 27 and specifically the sealing gasket 37 by a latching mechanism, indicated generally by the reference numeral 39.

Figure 2A:
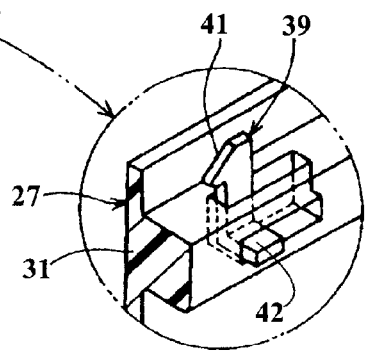
FIG. 2A is an enlarged view of the area encompassed by the circle in FIG. 2.

This latching mechanism 39 includes a slidably supported lock 41 having a leg portion 42 that is exposed immediately in front of the rider as seen in FIGS. 2 and 2A so as to slide it into engagement with a keeper 43 carried on the underside of the cover 38. The cover 38 is pivotally supported at the forward edge thereof by a pair of spaced apart hinges 44.

In accordance with another feature of the invention, a meter display, indicated generally by the reference numeral 45 is mounted on the cover 38 in such a way that it can be mounted from above the handlebar cover 25. To this end, the cover 38 has in its upper surface 46 a translucent panel 47 that faces a liquid crystal display 48 of a display element 49. The display element 49 has an outstanding flange portion that is connected by threaded fasteners 51 to the cover 38 on the side opposite the face 46 when then cover 38 is in its open position as shown in the phantom line view of FIG. 3. A further cover holder 52 is affixed around the display element 49 by additional threaded fasteners 53 that are threaded into the cover 38. This cover holder 52 has an opening that passes a wire conductor 54, which is fixed, to the front wall 33 of the box 27 by fasteners 55. This conductor 54 passes through an opening 56 in the lower box wall 35 and is connected by an electrical connector 57 to a vehicle mounted sensor 58. The sensor 58 outputs information to the display element 49 for processing and display on the liquid crystal display 48.

The sensor 58 may be a sensor that senses vehicle speed and the display element 49 can display a vehicle speed either in digital or analog form or both. Of course, other information can also be displayed.

Thus, it should be readily apparent that the device provides not only a compact and neat mounting for the display, but also places it in a position where it can be easily viewed by a rider seated on the seat 17. In addition, the rider can store small articles under the display in the storage box 27 without having to leave the seat 17. Of course, the foregoing description is that of a preferred embodiment of the invention and various changes and modification may be made without departing from the spirit and scope of the invention, as defined by the appended claims.

What is claimed is:

1. A vehicle having a seat adapted to accommodate a rider seated with his feet extending forwardly and downwardly, a handlebar at the front of said seat for steering of said vehicle in its path of movement, a cover fixed to and enclosing a part of said handlebar and a display mounted above said handlebar on a portion of said cover that is pivotal relative to the remainder of said cover and is viewable when said pivotal cover portion is in a closed position.

2. A vehicle as set forth in claim 1 wherein the display is attached to a surface of the pivotal cover portion that normally faces downwardly in use of the vehicle and which is accessible from above when the pivotal cover portion is pivoted to an opened position.

3. A vehicle as set forth in claim 1 wherein the pivotal cover portion removably encloses a storage compartment.

4. A vehicle as set forth in claim 3 wherein the display is attached to a surface of the pivotal cover portion that normally faces downwardly in use of the vehicle and which is accessible from above when the pivotal cover portion is pivoted to an opened position.

5. A vehicle as set forth in claim 4 wherein the pivotal portion of the cover has its pivot axis at its front edge.

* * * * *